(12) United States Patent
Tang et al.

(10) Patent No.: US 12,524,020 B2
(45) Date of Patent: Jan. 13, 2026

(54) APPARATUS FOR CLEANING POOL AND CONTROLLING METHOD

(71) Applicant: Shenzhen Aiper Intelligent Co., Ltd., Shenzhen (CN)

(72) Inventors: Gujie Tang, Shenzhen (CN); Qingxiang Song, Shenzhen (CN)

(73) Assignee: Shenzhen Aiper Intelligent Co., Ltd., Shenzhen (CN)

( * ) Notice: Subject to any disclaimer, the term of this patent is extended or adjusted under 35 U.S.C. 154(b) by 0 days.

(21) Appl. No.: 18/933,227

(22) Filed: Oct. 31, 2024

(65) Prior Publication Data
US 2026/0003358 A1  Jan. 1, 2026

(30) Foreign Application Priority Data
Jun. 27, 2024  (CN) .......................... 202410855021.5

(51) Int. Cl.
| | | |
|---|---|---|
| *G05D 1/24* | (2024.01) | |
| *G05D 1/245* | (2024.01) | |
| *G05D 1/246* | (2024.01) | |
| G05D 105/10 | (2024.01) | |
| G05D 107/00 | (2024.01) | |

(52) U.S. Cl.
CPC ............ *G05D 1/246* (2024.01); *G05D 1/245* (2024.01); *G05D 2105/10* (2024.01); *G05D 2107/29* (2024.01)

(58) Field of Classification Search
CPC .... G05D 1/246; G05D 1/245; G05D 2105/10; G05D 2107/29
See application file for complete search history.

(56) References Cited

U.S. PATENT DOCUMENTS

| | | | |
|---|---|---|---|
| 2006/0010638 A1 | 1/2006 | Shimizu et al. | |
| 2020/0033865 A1* | 1/2020 | Mellinger, III | ....... G05D 1/0219 |
| 2021/0064043 A1* | 3/2021 | Kulkarni | ................ G05D 1/028 |
| 2021/0165421 A1* | 6/2021 | Ko | ........................ G05D 1/028 |
| 2022/0229440 A1* | 7/2022 | Man | ....................... G05D 1/027 |
| 2024/0254796 A1* | 8/2024 | van der Meijden | .. E04H 4/1654 |
| 2024/0411321 A1* | 12/2024 | Ding | ..................... G05D 1/648 |

FOREIGN PATENT DOCUMENTS

| | | | |
|---|---|---|---|
| CA | 112947408 | * | 6/2021 |
| CN | 115822334 | * | 3/2023 |
| CN | 118170143 | * | 6/2024 |
| EP | 1672455 A1 | | 6/2006 |
| WO | WO 2023155465 | * | 8/2023 |

OTHER PUBLICATIONS

Extended European Search Report dated Jun. 2, 2025 for European Application No. 25156898.6.

* cited by examiner

*Primary Examiner* — Alexander Markoff
(74) *Attorney, Agent, or Firm* — David D. Brush; Westman, Champlin & Koehler, P.A.

(57) ABSTRACT

Disclosed are an apparatus for cleaning a pool and a method for controlling the apparatus. The method includes rotating the apparatus by a first angle in response to an arrival of the apparatus at a corner formed by edges of walls of a pool, determining a plurality of distances between the apparatus and the edges of the walls in front of the apparatus during rotating by the first angle, determining a second angle based on the plurality of distances, and rotating the apparatus by the second angle.

9 Claims, 5 Drawing Sheets

1. Data Collection    2. Data Fitting    3. Angle Prediction

APPARATUS FOR CLEANING POOL AND CONTROLLING METHOD

CROSS-REFERENCE

The present disclosure claims a benefit of, and priority to Chinese Patent Application No. 202410855021.5 filed on Jun. 27, 2024, the disclosure of which is hereby expressly incorporated by reference herein in its entirety.

TECHNICAL FIELD

The present disclosure relates to an apparatus for cleaning a pool and a method for controlling the apparatus.

BACKGROUND

An apparatus for cleaning a pool (also referred to as a cleaning apparatus, a cleaning robot, a robot, a movable robot, or an electronic apparatus herein) may be configured to build a map for the pool by moving along edges of the pool.

SUMMARY

In a first aspect, disclosed is a method for controlling an apparatus for cleaning a pool. The method may comprises rotating the apparatus by a first angle in response to an arrival of the apparatus at a corner formed by edges of walls of the pool, determining a plurality of distances between the apparatus and the edges of the walls in front of the apparatus during rotating the apparatus by the first angle, determining a second angle based on the plurality of distances, and rotating the apparatus by the second angle.

In an embodiment, the second angle may be determined based on the plurality of distances and information on edges of the pool obtained before rotating the apparatus by the first angle.

In an embodiment, a fitted direction may be obtained by fitting the plurality of distances, and a posture direction may be determined based on posture data during rotating the apparatus by the first angle. The second angle may be determined based on the fitted direction and the posture direction.

In an embodiment, a reference direction may be determined based on an initially obtained distance and a finally obtained distance among the plurality of distances, and the fitted direction may be modified based on the reference direction.

In an embodiment, a vector difference between the reference direction and the fitted direction may be determined, and the fitted direction may be modified into an opposite direction of the fitted direction in a case where the vector difference exceeds a predetermined range for the vector difference.

In an embodiment, the posture data may be obtained by an inertial measurement unit in the apparatus.

In an embodiment, the method may further comprise controlling the apparatus to clean a water surface of the pool along the walls with the apparatus being at least a predetermined distance away from the walls.

In an embodiment, the predetermined distance may be larger than or equal to 25 cm and may be less than or equal to 35 cm.

In an embodiment, the first angle may be larger than or equal to 10 degrees and may be less than or equal to 40 degrees.

In an embodiment, a number of the plurality of distances may be larger than or equal to 20 and may be less than or equal to 100.

In an embodiment, the method may further comprise determining the arrival of the apparatus at the corner in a case where a distance between the apparatus and the corner is less than a predetermined distance threshold.

In an embodiment, the method may further include terminating the rotation of the apparatus by the second angle in a case where an orientation or moving direction of the apparatus becomes parallel to an edge of a wall of the pool close to and facing a side of the apparatus during the rotation of the apparatus by the second angle.

In a second aspect, disclosed is an apparatus for cleaning a pool. The apparatus may comprise: a data sensor configured to obtain a plurality of distances between the apparatus and edges of walls of the pool in front of the apparatus during rotating the apparatus by a first angle in response to an arrival of the apparatus at a corner formed by the edges of the walls; an angle calculator configured to determine a second angle base on the plurality of distances; and a controller configured to rotate the apparatus by the first angle in response to the arrival of the apparatus at the corner, and to rotate the apparatus by the second angle.

In an embodiment, the second angle may be determined, for example by the angle calculator, based on the plurality of distances and information on edges of the pool obtained before rotating the apparatus by the first angle.

In an embodiment, a fitted direction may be obtained, for example by the angle calculator, by fitting the plurality of distances, and a posture direction may be determined, for example by the angle calculator, based on posture data during rotating the apparatus by the first angle. The second angle may be determined based on the fitted direction and the posture direction.

In an embodiment, a reference direction may be determined, for example by the angle calculator, based on an initially obtained distance and a finally obtained distance among the plurality of distances, and the fitted direction may be modified, for example by the angle calculator, based on the reference direction.

In an embodiment, a vector difference between the reference direction and the fitted direction may be determined for example by the angle calculator, and the fitted direction may be modified, for example by the angle calculator, into an opposite direction of the fitted direction in a case where the vector difference exceeds a predetermined range for the vector difference.

In an embodiment, the apparatus may further comprise an inertial measurement unit configured to obtain the posture data.

In an embodiment, the apparatus may be controlled, for example by the controller, to clean a water surface of the pool along the walls with the apparatus being at least a predetermined distance away from the walls.

In an embodiment, the predetermined distance may be larger than or equal to 25 cm and may be less than or equal to 35 cm.

In an embodiment, the first angle may be larger than or equal to 10 degrees and may be less than or equal to 40 degrees.

In an embodiment, a number of the plurality of distances may be larger than or equal to 20 and may be less than or equal to 100.

In an embodiment, the arrival of the apparatus at the corner may be determined, for example by the controller or the angle calculator, in a case where a distance between the apparatus and the corner is less than a predetermined distance threshold.

In an embodiment, the apparatus may further include at least one posture sensor configured to obtain an orientation or moving direction of the apparatus relative to an edge of a wall of the pool close to and facing a side of the apparatus, and the controller may be further configured to terminate the rotation of the apparatus by the second angle in a case where the orientation or moving direction of the apparatus becomes parallel to the edge of the wall of the pool close to and facing the side of the apparatus during the rotation of the apparatus by the second angle.

In a third aspect, disclosed is a device for controlling an apparatus for cleaning a pool. The device may comprise: a data sensor configured to obtain a plurality of distances between the apparatus and edges of walls of the pool in front of the apparatus during rotating the apparatus by a first angle in response to an arrival of the apparatus at a corner formed by the edges of the walls; an angle calculator configured to determine a second angle base on the plurality of distances; and a controller configured to rotate the apparatus by the first angle in response to the arrival of the apparatus at the corner, and to rotate the apparatus by the second angle.

In an embodiment, the second angle may be determined, for example by the angle calculator of the device, based on the plurality of distances and information on edges of the pool obtained before rotating the apparatus by the first angle.

In an embodiment, a fitted direction may be obtained, for example by the angle calculator of the device, by fitting the plurality of distances, and a posture direction may be determined, for example by the angle calculator, based on posture data during rotating the apparatus by the first angle. The second angle may be determined based on the fitted direction and the posture direction.

In an embodiment, a reference direction may be determined, for example by the angle calculator of the device, based on an initially obtained distance and a finally obtained distance among the plurality of distances, and the fitted direction may be modified, for example by the angle calculator of the device, based on the reference direction.

In an embodiment, a vector difference between the reference direction and the fitted direction may be determined for example by the angle calculator of the device, and the fitted direction may be modified, for example by the angle calculator of the device, into an opposite direction of the fitted direction in a case where the vector difference exceeds a predetermined range for the vector difference.

In an embodiment, the device may further comprise an inertial measurement unit configured to obtain the posture data.

In an embodiment, the apparatus may be controlled, for example by the controller of the device, to clean a water surface of the pool along the walls with the apparatus being at least a predetermined distance away from the walls.

In an embodiment, the predetermined distance may be larger than or equal to 25 cm and may be less than or equal to 35 cm.

In an embodiment, the first angle may be larger than or equal to 10 degrees and may be less than or equal to 40 degrees.

In an embodiment, a number of the plurality of distances may be larger than or equal to 20 and may be less than or equal to 100.

In an embodiment, the arrival of the apparatus at the corner may be determined, for example by the controller or the angle calculator of the device, in a case where a distance between the apparatus and the corner is less than a predetermined distance threshold.

In an embodiment, the device may further include at least one posture sensor configured to obtain an orientation or moving direction of the apparatus relative to an edge of a wall of the pool close to and facing a side of the apparatus, the controller may be further configured to terminate the rotation of the apparatus by the second angle in a case where the orientation or moving direction of the apparatus becomes parallel to the edge of the wall of the pool close to and facing the side of the apparatus during the rotation of the apparatus by the second angle.

In a fourth aspect, disclosed is an electronic device including at least one processor and at least one memory with instructions stored thereon. The instructions may be loaded and executed by the at least processor so that the electronic device may implement the method in the first aspect for controlling an apparatus for cleaning a pool.

In a fifth aspect, disclosed is a storage media with instructions stored thereon. The instructions may be loaded and executed by at least processor for example in the apparatus in the second aspect or the device in the third aspect, so that the electronic device may implement the method in the first aspect for controlling an apparatus for cleaning a pool.

In a sixth aspect, disclosed is a computer program product comprising instructions stored in a storage medium. The instructions may be loaded and executed by at least processor for example in the apparatus in the second aspect or the device in the third aspect, so that the electronic device may implement the method in the first aspect for controlling an apparatus for cleaning a pool.

DETAILED DESCRIPTION

Embodiments of the present disclosure will be described in detail hereafter, examples of which are illustrated in the accompanying drawings wherein the same or similar reference numerals may indicate the same or similar elements or elements with the same or similar functions. The embodiments described below with reference to the drawings are exemplary and are merely used to explain the disclosure, and should not be interpreted as limitations to the disclosure.

It may be understood by those skilled in the art that singular forms modified by "a", "an", "said" and "the" herein may also include plural forms unless specifically stated. It is also appreciated that the wording "comprising" or "including" in the specification of this disclosure means the presence of said features, integers, steps, operations, elements and/or components, but does not exclude the presence or addition of one or more other features, integers, steps, operations, elements, components and/or combinations thereof. It is appreciated that an element "being connected" or "being coupled" to another element may include the element being connected or coupled directly to another element, and/or a case of an existence of one or more intervening elements. Furthermore, "being connected" or "being coupled" herein may include a wireless connection or wireless coupling. In addition, the wordings "and/or" and "at least one of" may include all or any combinations of one or more items among the listed items.

As described above, the cleaning apparatus may be configured to build a map for the pool by moving along edges of the pool. However, it may be difficult for the cleaning apparatus to predict an angle for a rotation when it arrives at the edge, for example due to a lack of map information on regions ahead, and thus efficiency of building the map may be reduced.

Figure 1A:
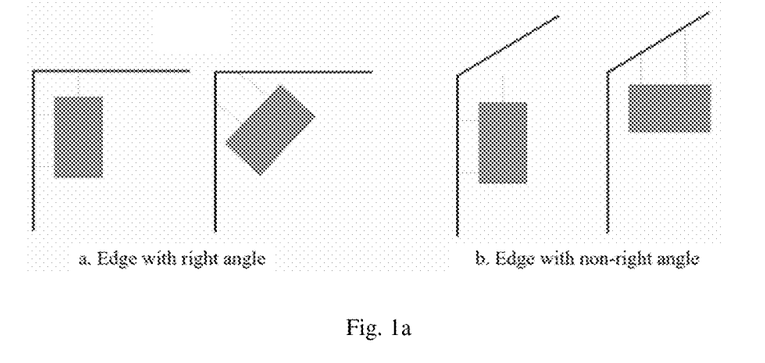
FIG. 1a illustrates schematically examples for controlling a cleaning apparatus.

Accordingly, for example, in response to an arrival of the cleaning apparatus at the edge for example as shown in the left part in FIG. 1a, the cleaning apparatus may be controlled to rotate arbitrarily by a certain angle (e.g. 90 degrees), which may be suitable for a case of the edges with right angles, but may be inefficient for example in a case of the edges with non-right angles for example as shown in right part in FIG. 1a where a difference between ultrasonic waves from two sides of the cleaning apparatus may become large and the robot may become much away from the wall after the rotation, and where the cleaning apparatus may be rotated again for example.

Figure 1B:
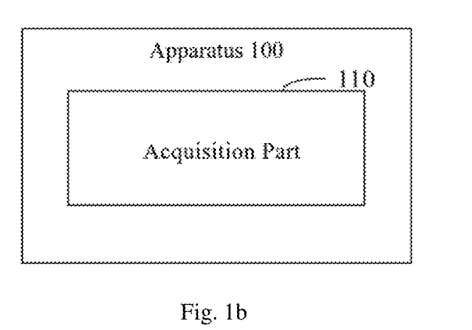
FIGS. 1b and 1c illustrate schematically example implementations in an exemplary embodiment of the present disclosure.

In another example, for the case of the edges with non-right angles as shown in right part in FIG. 1b, the cleaning apparatus may be controlled to rotate by a certain angle until the ultrasonic data on both sides of the cleaning apparatus become substantially identical, which, however, may suffer from the case of the edges with right angles as shown in the left part in FIG. 1b. For example, in the case of the edges with right angles, it is highly possible that the ultrasonic data on both sides of the cleaning apparatus reach identical when the cleaning apparatus rotates by around 45 degrees, and the robot may suffer from an increased risk of hitting walls after switching from the rotation to a movement along a straight line.

In the above examples, the cleaning apparatus is controlled to rotate by a certain angle to avoid obstacles. In a case where the rotated angle does not match a preset angle of the corner of the edges, the cleaning apparatus may fail to move close to the edge corner and a side of the cleaning apparatus may become not parallel to the wall. Then, another rotation of the cleaning apparatus may be required to adjust the cleaning apparatus to be close to the wall. Thus, an accuracy of avoiding obstacles by rotation may be reduced.

In addition, in the above examples, distances between a side of the cleaning apparatus and the wall are detected during the rotation, and the rotation will not be stopped until the detected distances satisfy a predetermined condition, for example, until the distances between the wall and the cleaning apparatus become consistent. Such a detection may be stopped in advance for example in a case where the predetermined condition is satisfied at some part of edges with certain angles and shapes. The accuracy of avoiding obstacles by rotation may thus be reduced, and for example a risk of hitting walls may be increased or another rotation of the cleaning apparatus may be required. For example, for an edge corner with an angle of 90 degrees, the cleaning apparatus may determine to stop the rotation when it rotates by 45 degrees with the sensed data showing that the distances between a side of the cleaning apparatus and the wall is identical, and then will hit the walls due to a subsequent movement along a straight line.

Due to a lack of information on the obstacles in front of the cleaning apparatus and in turn a prediction ability, the cleaning apparatus may fail to control its movement direction while moving along the edges. Thus, it is expected to improve the accuracy of the obstacle avoidance by rotation for the cleaning apparatus.

In one or more embodiments of this disclosure, disclosed is a method for controlling the cleaning apparatus, which may be applied to the cleaning apparatus or a control device in the cleaning apparatus. The control device may be deployed in an electronic apparatus such as the cleaning apparatus. In some embodiments, the electronic apparatus may include a computer with a Von Neumann architecture. For example, the computer may include a desktop computer, a notebook computer, a server or the like. The electronic apparatus may also include a portable and movable acquisition apparatus. For example, the electronic apparatus may include a movable robot equipped with the acquisition apparatus, such as the cleaning robot or apparatus.

FIGS. 1a and 1b illustrate schematically example implementations in an exemplary embodiment of the present disclosure. It is noted that these implementations are merely examples suitable for the present disclosure but should not be considered as any limitations to the present disclosure.

As show in FIG. 1b, an example implementation may include an acquisition part 110.

For example, the acquisition part 110 may be configured in the cleaning apparatus 100. The method for controlling the cleaning apparatus in an embodiment may be implemented by the cleaning apparatus 100 independently. For example, the acquisition part 110 in the cleaning apparatus 100 may be configured to collect distance data, to predict an angle for the rotation of the cleaning apparatus 100 based on the collected distance data, and to control the cleaning apparatus 100 to rotate by the predicted angle to avoid obstacles, so that the accuracy of obstacle avoidance by rotation may be improved.

Figure 1C:
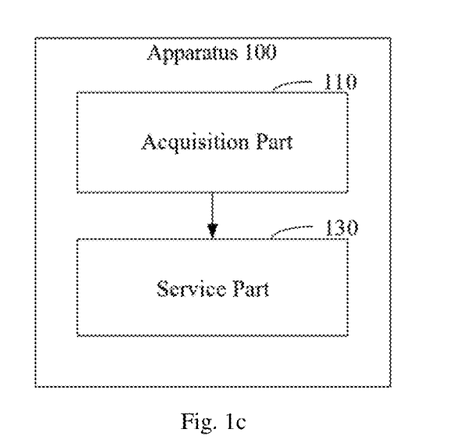

As show in FIG. 1c, another example implementation may include the acquisition part 110 and a service part 130.

For example, the acquisition part 110 may include a data collector or sensor configured to obtain distance data (e.g. a plurality of distances) and included in the cleaning apparatus 100. For example, the cleaning apparatus 100 may be a movable robot equipped with the data sensor including but not limited to a camera, a laser range finder, an ultrasonic range finder and/or any other electronic device capable of obtaining or collecting distance data.

The service part 130 may be a processor or controller included in or integrated on the cleaning apparatus 100, such as a chip.

The service part 130 may also be an external terminal for the cleaning apparatus 100, which may be configured to provide background services including but not limited to control services for the cleaning apparatus 100. Data transmissions between the service part 130 and the cleaning apparatus 100 may be implemented via a network communication connection which is established in advance between the service part 130 and the cleaning apparatus 100 by wired or wireless means. The transmitted data may include but is not limited to distance data and so on.

For example, the acquisition part 110 in the cleaning apparatus 100 may collect or sense distance data at the edge corner, and may transmit the sensed distance data to the service part 130 through interactions between the cleaning apparatus 100 and the service part 130, to request the service part 130 to provide control services for the cleaning apparatus 100.

For example, the service part 130 (either in or external to the cleaning apparatus 100) may call control services for the cleaning apparatus 100 to predict a rotation angle for the cleaning apparatus 100 and to control the cleaning apparatus 100 to rotate by the predicted rotation angle for obstacle avoidance, after receiving the distance data from the acquisition part 110, so that the accuracy of the obstacle avoidance by rotation may be improved.

Figure 2:
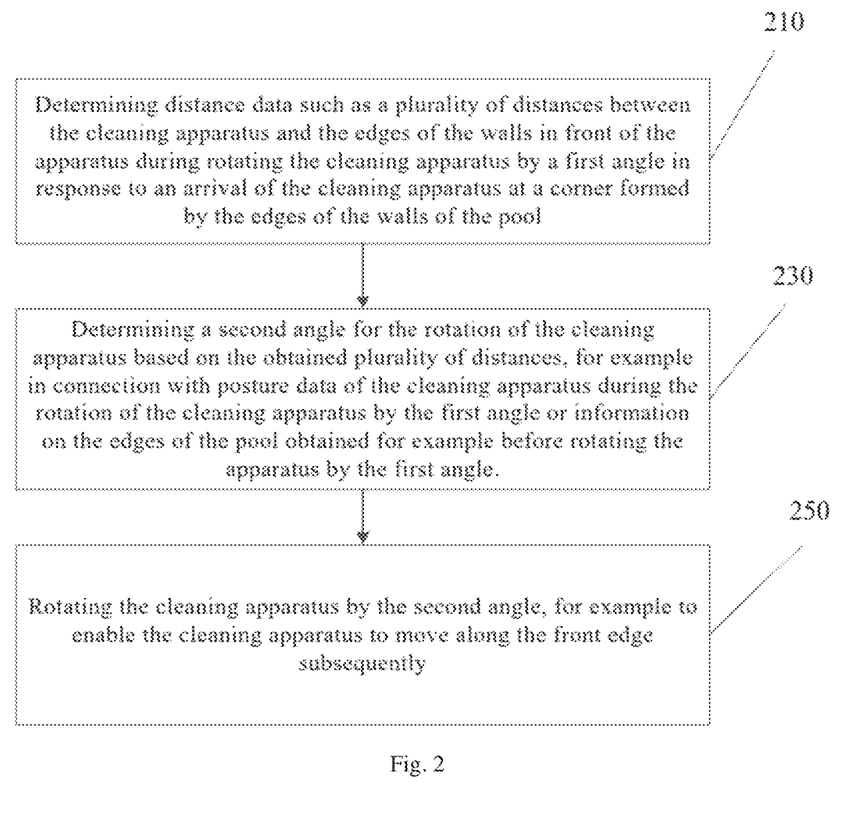
FIG. 2 illustrates a flowchart of a method for controlling the cleaning apparatus in an exemplary embodiment of the present disclosure.

FIG. 2 illustrates a flowchart of a method for controlling the cleaning apparatus in an exemplary embodiment of the present disclosure. The method may be applicable to an electronic device such as the service part 130 external to the cleaning apparatus 100, and may also be applied to the cleaning apparatus 100 configured with the acquisition part 110 and possibly together with the service part 130.

For convenience of description, the examples will be described hereafter in a case where the method is executed by an electronic device such as a processor or controller in the cleaning apparatus. However, this disclosure is not limited thereto.

As shown in FIG. 2, the method may include a step 210, a step 230, and a step 250.

In the step 210, distance data such as a plurality of distances between the cleaning apparatus and the edges of the walls in front of the apparatus may be determined during rotating the cleaning apparatus by a first angle in response to an arrival of the cleaning apparatus at a corner formed by the edges of the walls of the pool.

In the step 210, the distance data such as the plurality of distances may be collected or sensed statically or dynamically at the corner by cleaning apparatus. For example, the cleaning apparatus may collect statically the distance data by stopping near or at the edge corner and by obtaining the distance data at the edge corner through a data collection operation. For example, the cleaning apparatus may also collect dynamically the distance data by keeping moving after approaching the edge corner and by collecting the distance data while adjusting its posture. Different values may be assigned to predetermined thresholds for identifying the edge corners respectively for the static and dynamic collections of the distance data. For example, the predetermined threshold for the edge corner in the case of the dynamic collection of distance data may be greater than that for the edge corner in the case of the static collection of distance data.

For example, the collection of the distance data may include performing, by the cleaning apparatus, an operation of moving for data collection in response to an approach of the cleaning apparatus to a corner of the edges, and collecting the distance data for a region in front of the cleaning apparatus in a driving direction of the cleaning apparatus during the operation of the movement for the data collection.

In an embodiment, the distance data may be collected in a manner such as (but not limited to) a laser ranging collection, ultrasonic ranging collection, and so on. For example, the cleaning apparatus may be configured with an ultrasonic range finder, and ultrasonic data may be collected continuously for the edge corner during the movement of the cleaning apparatus at the edge corner, which may be used as the distance data. The distance data may be collected for example in a single-line manner, and the posture of the cleaning apparatus may be changed to collect data points of the edge corners in multiple directions so that data may be sampled from multiple spatial angles and boundary information of the edge corners may be simulated based on the collected data points.

For example, the operation of moving for data collection may include a rotation, and the cleaning apparatus may rotate by a preset angle for the data collection and may obtain the distance data by collecting continuously ultrasonic data for the region in front of the cleaning apparatus during the rotation.

In an exemplary embodiment, the cleaning apparatus may clean the water surface along the wall of the pool, and the minimum distance between the cleaning apparatus and the pool may be for example from 25 cm to 35 cm.

In the step 230, a second angle may be determined for the rotation of the cleaning apparatus based on the obtained plurality of distances, for example in connection with posture data of the cleaning apparatus during the rotation of the cleaning apparatus by the first angle or information on the edges of the pool obtained for example before rotating the apparatus by the first angle.

For example, the posture data may be data describing spatial positions of the cleaning apparatus relative to the edge corner and changes of the postures of the cleaning apparatus during the movement.

For example, changes of spatial positions, orientations and movement directions may be recorded for the cleaning apparatus during the movement of at the edge corner, and position data may be obtained to determine a final posture of the cleaning apparatus after the data collection. Then, a relative posture between the cleaning apparatus and the edge corner may be determined according to information on a spatial position, appearance and shape of the edge corner described by the distance data and the information on the changes of the spatial positions, orientations and movement directions of the cleaning apparatus described by the posture data, and the second angle between the edge corner and the cleaning apparatus may be predicted.

In addition, the information on the edges of the pool may also be used when calculating the second angle wherein the information on the edges of the pool may be data collected by ultrasonic waves from a side of the cleaning apparatus to an edge of the pool facing the side of the cleaning apparatus.

For example, information on a front edge of the pool may be obtained based on multiple distances sensed for the region in front of the cleaning apparatus, and information on a side edge of the pool may be obtained based on the data collected by ultrasonic waves from a side of the cleaning apparatus to the side edge of the pool. An angle between adjacent edges of the pool may be calculated based on the information on the front edge of the pool and the information on the side edge of the pool, and the second angle (i.e. an angle between the edge corner and the cleaning apparatus) may be predicted based on the calculated angle and the first angle by which the cleaning apparatus has rotated for obtaining the information on the front edge of the pool. For example, the second angle may be a difference between the calculated angle of adjacent edges of the pool and the first angle.

In the step 250, the cleaning apparatus may be rotated by the second angle, for example to enable the cleaning apparatus to move along the front edge subsequently.

For example, the second angle may be an angle by which the cleaning apparatus may complete a rotation and will not hit the edge corner during the rotation for the obstacle avoidance. The cleaning apparatus may move close to the other side of the edge corner after rotating by the second angle for avoiding obstacles, to continue to move along the front edge.

In an exemplary embodiment, the first angle may be larger than or equal to 10 degrees and be less than or equal to 40 degrees.

In the above examples, the distance data is collected at the edge corner, the second angle for the rotation of the cleaning apparatus is predicted based on the distance data and the posture data of the cleaning apparatus, and the cleaning apparatus is rotated by the predicted second angle for the obstacle avoidance. Thus, for example, the second angle (i.e. the angle between the cleaning apparatus and the edge corner) may be predicted in real-time during the movement of the cleaning apparatus at the edge corner, and priori information may be provided for the cleaning apparatus to achieve a one-time rotation for the obstacle avoidance, so that collisions for example during and after the rotation for the obstacle avoidance may be avoided, and the safety may be improved. Further, for example, the cleaning apparatus may cling to the edge after the one-time rotation for the obstacle avoidance, so that a possible repeated obstacle avoidance due to a failed obstacle avoidance may be avoid and accordingly the precision of the rotation for the obstacle avoidance may be improved.

Figure 3:
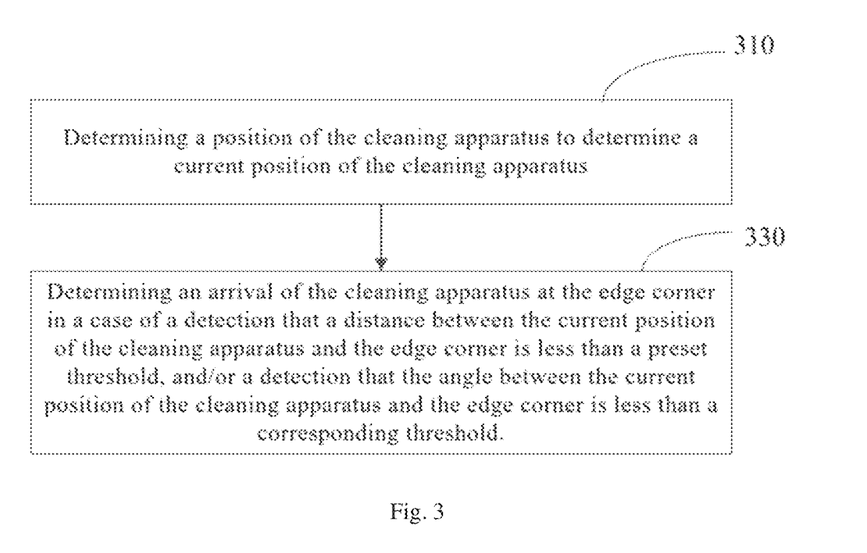
FIG. 3 illustrates a flowchart for determining an arrival of the cleaning apparatus at a corner in an exemplary embodiment of the present disclosure.

As shown in FIG. 3, the identification, by the cleaning apparatus, of the corner formed by the edges of the pool wall may include a step 310 and a step 330.

In the step 310, a position of the cleaning apparatus may be detected to determine a current position of the cleaning apparatus.

For example, a position of the cleaning apparatus relative to an environment of the cleaning apparatus may be obtained by the position detection, and it may be determined whether the cleaning apparatus has moved to the corner by detecting the position of the cleaning apparatus.

The cleaning apparatus may obtain distances between the edge ahead and the cleaning apparatus by continuously measuring distances through ultrasonic waves for regions in front of the cleaning apparatus during the movement, so as to determine the position of the cleaning apparatus.

In the step 330, an arrival of the cleaning apparatus at the edge corner may be determined in a case of a detection that a distance between the current position of the cleaning apparatus and the edge corner is less than a preset threshold, and/or a detection that the angle between the current position of the cleaning apparatus and the edge corner is less than a corresponding threshold.

For example, the threshold for the distance may be a distance between the corner and the cleaning apparatus during the rotation for avoiding obstacles. For example, the threshold for the angle may be an angle between the corner and the cleaning apparatus during the rotation for avoiding obstacles. The threshold for the distance and the threshold for the angle may be used to judge whether the cleaning apparatus has arrived at the corner or whether the cleaning apparatus needs to rotate to avoid obstacles. In a case where the distance between the cleaning apparatus and the edge in the moving direction becomes less than the threshold for the distance, and/or in a case where the angle between the current position of the cleaning apparatus and the corner becomes less than the threshold for the angle, the cleaning apparatus may determine that a continuous movement may lead to a wall-collision, and that the cleaning apparatus has arrived at the edge corner and the distance data collection may be performed so as to achieve the obstacle avoidance by rotation.

Thus, for example, the edge corner may be identified, and further enough space may be reserved for the rotation for avoiding obstacles, so that a collision to the walls by the cleaning apparatus may be prevented and a stability of the rotation for obstacle avoidance may be ensured.

Figure 4:
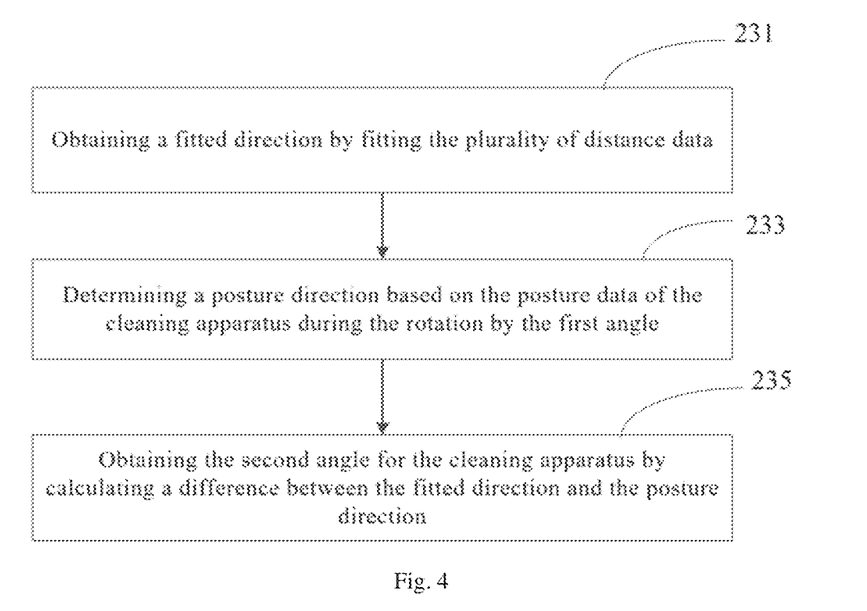
FIG. 4 illustrates a flowchart of a step 230 in FIG. 2 in an exemplary embodiment of the present disclosure.

As shown in FIG. 4, in an embodiment, the step 230 may include a step 231, a step 233, and a step 235.

In the step 231, a fitted direction may be obtained by fitting the plurality of distance data.

For example, the fitted direction may be a direction vector calculated according to the distance data, and may describe an orientation of the edge corner with respect to the cleaning apparatus.

In an embodiment, the distance data may include data points for describing the distances between the cleaning apparatus and the corner of the edge. For example, during sampling the distance data of the edge corner from multiple spatial angles by the cleaning apparatus, the cleaning apparatus may sample different parts of the corner and may collect data points for the different parts of the corresponding corner as the distance data. Then, the fitted direction for a whole of the edge corner may be obtained by a linear fitting of all data points.

In an embodiment, a linear fitting algorithm may be utilized to linearly fit the multiple distance data, and a fitting linear equation $y=ax+b$ corresponding to the fitted direction may be obtained.

In an exemplary embodiment, the amount of the distance data may be larger than or equal to 20 and may be less than or equal to 100.

In the step 233, a posture direction may be determined based on the posture data of the cleaning apparatus during the rotation by the first angle.

For example, the posture data may be data describing orientations of the cleaning apparatus obtained by detecting its rotation.

For example, the cleaning apparatus may continuously record data generated during the rotation of the cleaning apparatus, such as angular displacements and posture changes, and may calculate a current orientation after the rotation.

In an exemplary embodiment, the posture data may be obtained by an inertial measurement unit in the cleaning apparatus.

In the step 235, the second angle may be obtained for the cleaning apparatus by calculating a difference between the fitted direction and the posture direction.

For example, the difference between the fitted direction and the posture direction may be an angle difference. The fitted direction may be a direction of the edge at the corner relative to the cleaning apparatus, and the posture direction may be a current orientation of the cleaning apparatus. The cleaning apparatus may move in a direction parallel to and clinging to the edge of the edge corner after rotating by the differential angle between the fitted direction and the posture direction.

In an embodiment, the posture direction may be a direction of the movement of the cleaning apparatus at the current position, and the angle between the fitted direction from the fitting data and the posture direction of the cleaning apparatus at the current position may be the second angle for the rotation of the cleaning apparatus.

In an embodiment, the posture direction may be a direction of the movement of the cleaning apparatus at the initial position. Then, an angle between the fitted direction from the fitting data and the posture direction of the cleaning apparatus at the initial position, and an angle between the posture direction of the cleaning apparatus at the initial position and the posture direction of the cleaning apparatus at the current position, may be determined, and a difference between the two determined angles may be utilized as the second angle for the rotation of the cleaning apparatus.

Data about the edges at the edge corner are sampled as prior data in the above embodiment. Thus, for example, an angle for one-time rotation for the obstacle avoidance may be obtained without hitting the wall, and the safety and accuracy of the rotation for the obstacle avoidance may be ensured.

Figure 5:
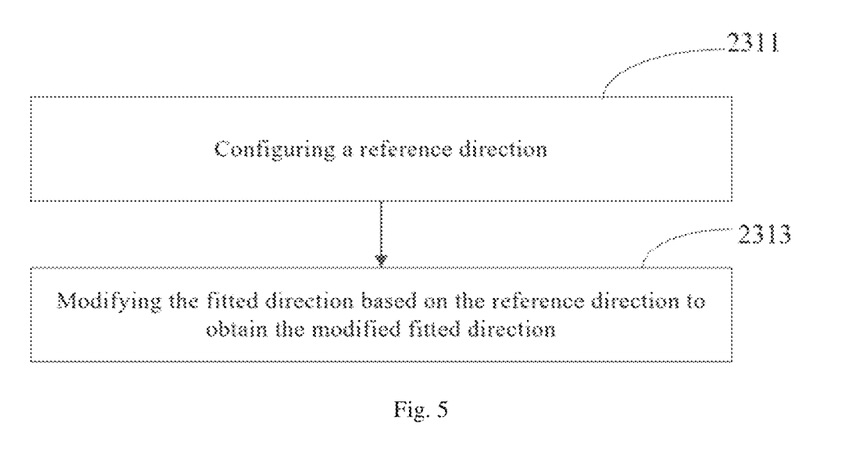
FIG. 5 illustrates a flowchart of a step 231 in FIG. 4 in an exemplary embodiment of the present disclosure.

In an exemplary embodiment, as shown in FIG. 5, the step 231 may include a step 2311 and a step 2313.

In the step 2311, a reference direction may be configured.

For example, the reference direction may be a straight line calculated according to at least two data points in the distance data. The scattered data points may be converted into the straight line representing the reference direction by generating the reference direction. For example, the more concentrated the data points in the distance data are, the closer the reference direction generated by two separate data points in the distance data is to the fitted direction.

In an embodiment, the reference direction may be calculated based on an initially obtained distance and a finally obtained distance among the plurality of obtained distances. In another embodiment, data points obtained at any other timings may be selected to calculate the reference direction, which is not limited to any embodiment.

In the step 2313, the fitted direction may be modified based on the reference direction to obtain the modified fitted direction.

Figure 6:
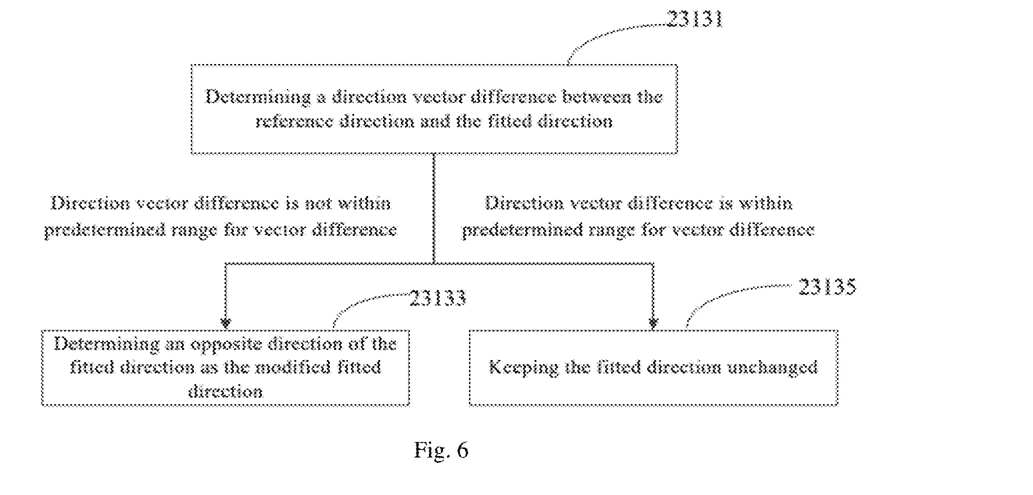
FIG. 6 illustrates a flowchart of a step 2313 in FIG. 5 in an exemplary embodiment of the present disclosure.

In an exemplary embodiment, as shown in FIG. 6, the step 2313 may include a step 23131, a step 23133, and a step 23135.

In the step 23131, a direction vector difference between the reference direction and the fitted direction may be determined.

In a case where the direction vector difference is not within or exceeds a predetermined range for the vector difference, the step 23133 may be proceeded on.

In a case where the direction vector difference is within or does not exceed the predetermined range for the vector difference, the step 23135 may be proceeded on.

In the step 23133, an opposite direction of the fitted direction may be determined as the modified fitted direction.

In the step 23135, the fitted direction may be kept unchanged.

For example, the predetermined range for the vector difference may be a threshold range for checking a difference between the reference direction and the fitted direction. In a case where the direction vector difference is not within or exceeds the predetermined range for the vector difference, the fitted direction is not accurate and leads to the excessive difference. Then, the accuracy of the fitted direction may be improved by modifying the fitted direction into its opposite direction.

A fitted direction matching a direction of the edge may be obtained by modifying the fitted direction, and the accuracy of the prediction of the second angle may be improved.

Figure 7:
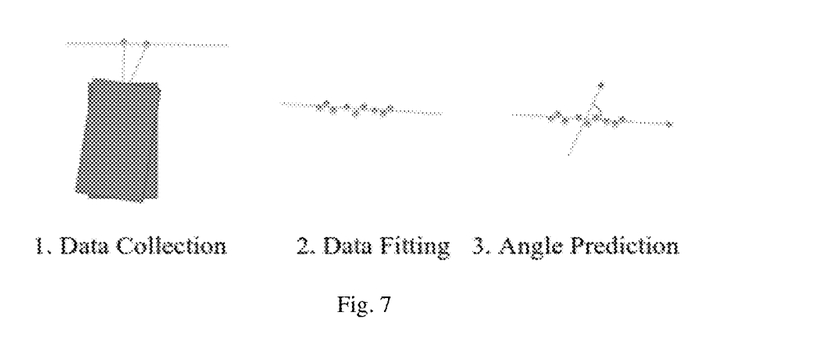
FIG. 7 illustrates schematically an example implementation for the method for controlling the cleaning apparatus in an exemplary embodiment of the present disclosure.

FIG. 7 illustrates schematically an example implementation for the method for controlling the cleaning apparatus in an exemplary embodiment of the present disclosure, wherein the cleaning apparatus may be a movable robot equipped with an ultrasonic range finder.

During the movement along edges of the pool, the movable robot may sense distances to the obstacles ahead by ultrasonic waves from the ultrasonic range finder.

In a case where the movable robot detects that a distance between the movable robot and the edge ahead becomes less than the threshold for the distance, the movable robot may stop its movement and rotate itself by the first angle such as 30 degrees, to collect distances between data points on the edges ahead within the first angle and the movable robot. Then, a fitted straight line may be generated by a data fitting based on the collected data. Examples of the data point and the fitted line are respectively shown by the circle dots the straight lines in FIG. 7.

For example, the initially obtained data point and the finally obtained data point may be utilized to calculate a direction vector A of the reference direction, and a direction vector of the fitted straight line may be calculated as B=(1,a). Then, the difference between the direction vector A and the direction vector B may be determined. In a case where the determined difference between A and B is within a preset threshold range, the direction vector B may be used as a direction vector C of the fitted straight line, or otherwise an opposite direction-B of the direction vector B may be used as the direction vector C of the fitted straight line.

Then, an angle between the direction vector C of the fitted straight line and an initial movement direction vector D when the movable robot stops its movement may be obtained by determining a difference between the direction vector C and the direction vector D. Further, the second angle for the rotation may be generated, for example by adding a direction deviation by the first angle (such as 30 degrees) to the obtained angle between the direction vector C and the initial movement direction vector D, or by generating a direction vector E through adding a direction deviation by the first angle (such as 30 degrees) to the initial movement direction vector when the movable robot stops its movement and then calculating an angle between the direction vector E and the direction vector C. Examples of the direction vector C and the direction vector E are respectively shown by the solid arrow and dotted line arrow in FIG. 7.

Then, the movable robot may rotate by the second angle, and continue to move for the detection along the edge. Thus, the obstacle avoidance by rotation may be implemented by the movable robot.

In the embodiment, the angle for the obstacle avoidance by rotation may be calculated in real-time by obtaining priori information through ultrasonic data ahead after the robot arrives at the edge, and by performing a data fitting, so that the stability and accuracy of the rotation for the obstacle avoidance may be improved.

In one or more embodiments, the cleaning apparatus may clean the water surface of the pool along the wall of the pool, and may obtain a plurality of distances between the cleaning apparatus and the edge of the wall ahead in a case of a identification of an arrival at the corner of the edge of wall. Then, an angle for the obstacle avoidance by a rotation of the cleaning apparatus may be predicted, and the cleaning apparatus may be rotated by the predicted angle for the obstacle avoidance, so that prior information may be provided for the cleaning apparatus for the obstacle avoidance by rotation. And thus, the angle for the rotation of the cleaning apparatus (i.e. the angle between the cleaning apparatus and the edge corner) may be predicted in real time, and the priori information may be provided for the cleaning apparatus to perform a one-time rotation for the obstacle avoidance. For example, the accuracy of the obstacle avoidance by rotation may be improved.

Embodiments of a device for controlling the cleaning apparatus will be described below, which may be used to implement the method for controlling the cleaning apparatus in the above examples. Details related to the method in the above embodiments may also be implemented by or in the device for controlling the cleaning apparatus.

Figure 8:
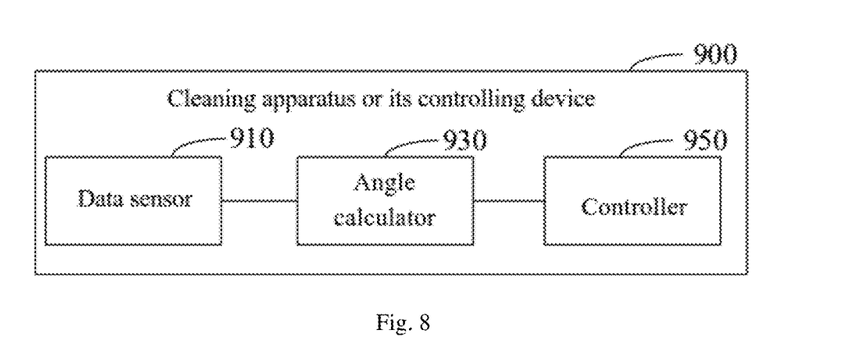
FIG. 8 illustrates a structural block diagram of a device for controlling the cleaning apparatus in an exemplary embodiment of the present disclosure.

As shown in FIG. 8, the cleaning apparatus or the device 900 for controlling the cleaning apparatus, which may be a part of or external to the cleaning apparatus, may include (but is not limited to) a data sensor 910, an angle calculator 930, and a controller 950.

The data sensor 910 may be configured to obtain a plurality of distances between the cleaning apparatus and the edges of the walls of the pool in front of the cleaning apparatus during rotating the cleaning apparatus by the first angle in response to an arrival of the cleaning apparatus at a corner formed by the edges of the walls.

The angle calculator 930 may be configured to determine the second angle base on the plurality of distances, for example in connection with posture data during rotating the cleaning apparatus by the first angle, or in connection with information on edges of the pool obtained before rotating the cleaning apparatus by the first angle.

The controller 950 may be configured to rotate the cleaning apparatus by the first angle in response to the arrival of the apparatus at the corner, and to rotate the cleaning apparatus by the second angle.

The above embodiment merely illustrates a possible structure of the device for controlling the cleaning apparatus. One or more operations or actions may be performed in one or more circuits or units different from the above examples, or the device for controlling the cleaning apparatus may include one or more circuits configured to perform a part or whole of the operations or actions. For example, at least a part of operations or actions performed by the controller 950 may be performed by the data sensor 910. For example, the data sensor 910 may be configured to rotate the cleaning apparatus by the first angle in response to an arrival of the cleaning apparatus at a corner formed by the edges of the walls, and to obtain a plurality of distances between the cleaning apparatus and the edges of the walls of the pool in front of the cleaning apparatus during rotating the cleaning apparatus by the first angle, and the controller 950 may be configured to rotate the cleaning apparatus by the second angle.

Further, the device for controlling the cleaning apparatus and the method for controlling the cleaning apparatus in the above embodiments belong to the same concept, and the details or features described for the method may also be applicable to the device, which will not be repeated here. Further, one or more parts described with respect to the device for controlling the cleaning apparatus may also be one or more parts in the cleaning apparatus. For example, the cleaning apparatus may include the above data sensor 910, angle calculator 930, and controller 950, and the device 900 may be a collective term for the data sensor 910, angle calculator 930, and controller 950 in the cleaning apparatus.

Figure 9:
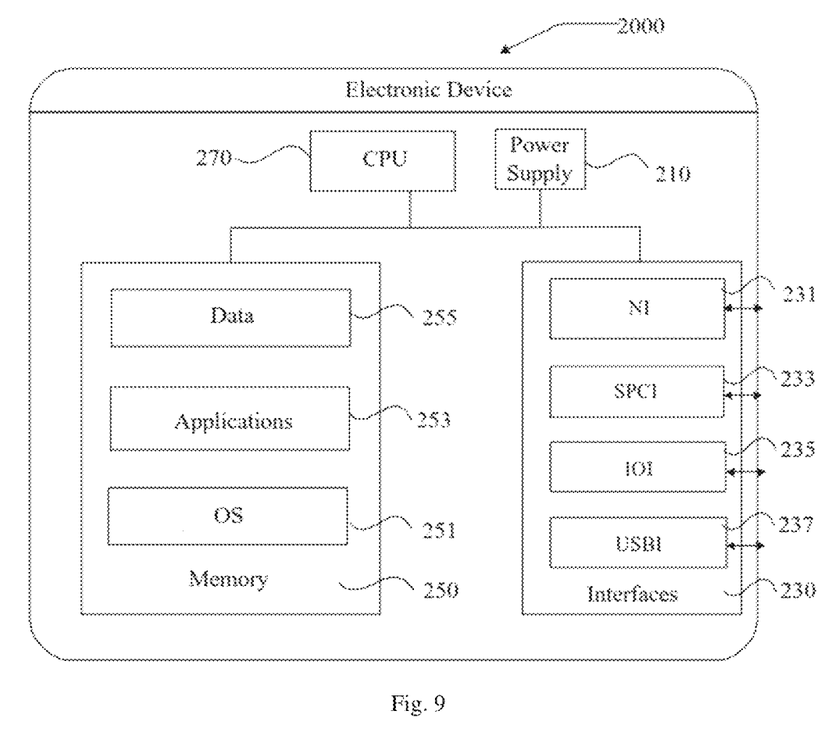
FIG. 9 illustrates a hardware structure diagram of an electronic device in an exemplary embodiment of the present disclosure.

FIG. 9 illustrates a structure diagram of an electronic device in an exemplary embodiment, which may be an example of the service part 130 as shown in FIG. 1*c*.

It is appreciated that the electronic device is merely an example adaptable to one or more embodiments of this disclosure and does not provide any limitations to this disclosure. For example, the electronic device is not limited to the example as shown in FIG. 9, and is not required to include one or more components in the electronic device 2000 in FIG. 9.

The hardware structure of electronic device 2000 may have different configurations. As shown in FIG. 9. the electronic device 2000 may include a power supply 210, interfaces 230, at least one memory 250, and at least one central processing unit (CPU) 270.

For example, the power supply 210 may be configured to provide an operating voltage for various hardware parts in the electronic device 2000.

The interfaces 230 may include at least one wired or wireless network interface (NI) 231 for interactions with external devices, for example, an interaction between the electronic device 2000 and a control terminal for the cleaning apparatus.

In another embodiment, as shown in FIG. 9, the interface 230 may further include at least one serial-to-parallel conversion interface (SPCI) 233, at least one input-output interface (IOI) 235, at least one USB interface (USBI) 237, and so on, which do not provide any limitations to this disclosure.

The memory 250 may store any suitable resources and may include a read-only memory, a random-access memory, a magnetic disk, an optical disk, or the like. The resources stored in the memory 250 may include an operating system 251, applications 253 and data 255. The resources may be stored in the memory 250 temporarily or permanently.

The operating system (OS) 251 is for managing and controlling various hardware parts and the applications 253 in the electronic device 2000, so as to implement operations and processing for massive data 255 in the memory 250 by the CPU 270. Examples of the operating system 251 may include Windows Server™, Mac OS X™, Unix™, Linux™, FreeBSD™, or the like.

The applications 253 may be computer-readable instructions for completing at least one task on the operating system 251, which may include at least one module (not shown in FIG. 9), each including computer-readable instructions for the electronic device 2000. For example, the device for controlling the cleaning apparatus may be implemented as one of the applications 253 deployed in the electronic device 2000.

The data 255 may be electronic data stored in the magnetic disk and may be stored in the memory 250.

The CPU 270 may include one or more processors and may be configured to communicate with the memory 250 through at least one communication bus to read the computer-readable instructions stored in the memory 250, so as to realize the operation and processing of the massive data 255 in the memory 250. For example, the CPU 270 reads a series of computer-readable instructions stored in the memory 250 to complete the method for controlling the cleaning apparatus.

In addition, this disclosure may be implemented in hardware or a combination of hardware and software, and is not limited to any specific hardware circuits, software or their combinations.

Figure 10:
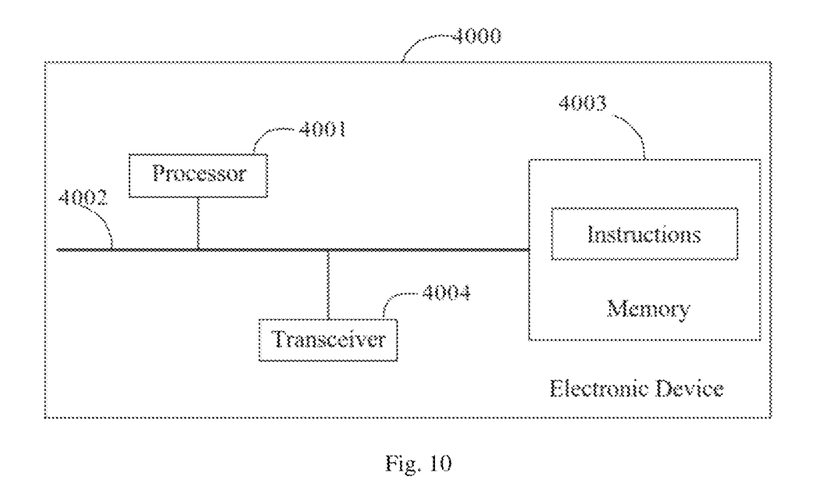
FIG. 10 illustrates a hardware structure diagram of an electronic device in an exemplary embodiment of the present disclosure.

FIG. 10 illustrates a hardware structure diagram of an electronic device 4000 in an exemplary embodiment of the present disclosure, which may include a robot equipped with an ultrasonic range finder, a desktop computer, a notebook computer, a server, and so on.

In FIG. 10, the electronic device 4000 includes at least one processor 4001 and at least one memory 4003.

Data interactions between the processor 4001 and the memory 4003 may be implemented through at least one communication bus 4002. The communication bus 4002 may include a path for transmitting data between the processor 4001 and the memory 4003. The communication bus 4002 may be a PCI (Peripheral Component Interconnect) bus or an EISA (Extended Industry Standard Architecture) bus. The communication bus 4002 may be divided into an address bus, a data bus, a control bus and the like. For convenience of description, the bus is represented by one thick line in FIG. 1a2, but it does not mean that there is only one bus or one type of bus.

Optionally, the electronic device 4000 may also include a transceiver 4004 configured for the data interactions between the electronic device and other electronic devices, such as data transmission and/or reception. The transceiver 4004 may be more than one, and the structure of the electronic device 4000 does not constitute any limitation to this application.

The processor 4001 may be a CPU, a general processor, a DSP (Digital Signal Processor), an ASIC (Application Specific Integrated Circuit), FPGA (Field Programmable Gate Array) or other programmable logic devices, transistor logic devices, hardware components or any combination thereof, which may implement or perform various illustrative logical blocks, modules and circuits described in connection with the disclosure. The processor 4001 may also be a combination for realizing computing functions, for example, including a combination of one or more microprocessors, a combination of DSP and microprocessor, or the like.

The memory 4003 may be or include, but is not limited to: ROM (Read Only Memory) or other types of static storage devices capable of storing static information and instructions; RAM (Random Access Memory) or other types of dynamic storage devices capable of storing information and instructions; EEPROM (electrically erasable programmable read only memory); CD-ROM (compact disc read only memory) or other optical disc storage, optical disc storage (including compact disc, laser disc, optical disc, digital versatile disc, Blu-ray disc, etc.); magnetic disc storage medium or other magnetic storage devices; or any other medium that may be used to carry or store expected program instructions or codes in form of instructions or data structures and may be accessed by the electronic device 4000.

The memory 4003 stores computer-readable instructions, and the processor 4001 may read the computer-readable instructions stored in the memory 4003 through the communication bus 4002.

The computer-readable instructions may be executed by one or more processors 4001 to implement the method for controlling the cleaning apparatus in the above embodiments.

In addition, in an embodiment, disclosed is also a storage medium, on which computer-readable instructions are stored, wherein the computer-readable instructions may be executed by one or more processors to implement the above method for controlling the cleaning apparatus.

In an embodiment, disclosed is also a computer program product comprising computer-readable instructions stored in a storage medium. One or more processors of the electronic device may read the computer-readable instructions from the storage medium, load and execute the computer-readable instructions, so that the electronic device can perform the above method for controlling the cleaning apparatus.

In one or more embodiments, the distance data may be collected at the edge corner to provide prior information, the angle for the rotation of the cleaning apparatus may be predicted based on relative spatial positions of the edge corner and the cleaning apparatus during the distance data collection, and then the cleaning apparatus is rotated by the determined angle to avoid obstacles. The angle for the rotation may be accurately predicted, collisions during and after the rotation for obstacle avoidance may be avoided, and the safety is improved. Further, a one-time rotation for obstacle avoidance may be implemented, so that the cleaning apparatus may be adhered to the edges after rotating for obstacle avoidance, repeated rotations for obstacle avoidance due to obstacle avoidance errors may be avoided, and the precision of rotating for obstacle avoidance may be improved. Obstacle avoidance may be achieved and the stability for the obstacle avoidance by rotation may be ensured for example by identifying the edge corner and maintain enough spaces for the obstacle avoidance by rotation. The precision of the angle prediction may be improved for example by modifying the fitted direction and obtain a modified fitted direction matching the edge direction. A final state before the obstacle avoidance by rotation may obtained precisely for the cleaning apparatus and the precision and stability of the obstacle avoidance by rotation may be ensured for example by modifying the movement direction of the cleaning apparatus. Further, the angel for the obstacle avoidance by rotation may be obtained in one go without hitting the walls, for example by obtaining the distance data at the edge corners as priori data, and thus the safety and precision of the obstacle avoidance by rotation may be ensured.

In another embodiment, the second angle may be a maximum angle for the subsequent rotation of the cleaning apparatus by the second angle, and the rotation of the cleaning apparatus by the second angle may be terminated in advance in a case where the orientation or moving direction of the cleaning apparatus becomes parrel with the edge of the wall close to and facing a side of the cleaning apparatus, along which the cleaning apparatus is to continue its movement, before a completion of the rotation of the cleaning apparatus by the second angle.

For example, the acquisition part 110 of the cleaning apparatus 100 as show in FIG. 1b or 1c, or the data sensor 910 of the cleaning apparatus 900 as shown in FIG. 8, may also include at least one posture sensor. The at least one posture sensor may be configured to obtain a posture (e.g. an orientation or moving direction) of the cleaning apparatus 100 or 900 relative to the edge of the wall of the pool facing the side of the cleaning apparatus 100 or 900.

The processor or controller in the cleaning apparatus 100 or 900, which may be an example of or included in the service part 130 in the cleaning apparatus 100 as shown in FIG. 1c or the controller 950 in the cleaning apparatus 900 as shown in FIG. 8, may be configured to determine, for example at least based on the sensed data from the at least one posture sensor, whether the cleaning apparatus 100 or 900 has a posture with its orientation or a moving direction parallel to the edge of the wall of the pool facing the side of the cleaning apparatus 100 or 900.

For example, the at least one posture sensor may include two or more distance sensors (e.g. two or more ultrasonic radars configured to transmit and receive ultrasonic waves with different frequencies) configured on the same side of the cleaning apparatus 100 or 900, and the cleaning apparatus 100 or 900 may have its side with the two or more distance sensors faced to the wall of the pool during the movement (including the rotation) of the cleaning apparatus 100 or 900 along the edge of the pool.

For example, the two or more distance sensors may be arranged as shown in FIG. 1a. In another example, the two or more distance sensors may be also arranged for example in a line along the movement direction or longitude direction of the cleaning apparatus 100 or 900, and may be closer to or concentrated in a frontal part (e.g. a front half) of the cleaning apparatus 100 compared to the example in FIG. 1a. In yet another example, the two or more distance sensors may also be closer to or concentrated in a rear part (e.g. a posterior half) of the cleaning apparatus 100 or 900.

Then, for example, the processor or controller in the cleaning apparatus 100 or 900 may determine a parallelization between the orientation or moving direction of the cleaning apparatus 100 or 900 and the edge of the wall of the pool facing the side of the cleaning apparatus 100 or 900 configuring the two or more distance sensors, for example by checking whether the sensed distance data from the two or more distance sensors become consistent (or substantially consistent) with each other, or whether differences among the sensed distance data from the two or more distance sensors become within a predetermined threshold range.

In another example, the at least one posture sensor may include at least one camera. For example, the at least one camera may be configured on the side of the cleaning apparatus 100 or 900 facing the wall of the pool during the movement (including the rotation) of the cleaning apparatus 100 or 900 along the edge of wall. The at least one camera may also be configured on the top of the cleaning apparatus 100 or 900 and/or any other one or more suitable locations on or in the cleaning apparatus 100 or 900, and may be change its orientation to the wall of the pool during the movement (including the rotation) of the cleaning apparatus 100 or 900 along the edge of the wall. Further, the at least one camera may be configured to capture at least one images about the wall of the pool to which the at least one camera is facing.

Then, for example, the processor or controller in the cleaning apparatus 100 or 900 may be configured to processing and/or analyzing the at least images from the at least one camera to determine whether the orientation or moving direction of the cleaning apparatus 100 or 900 becomes parallel to the edge of the wall of the pool.

In yet another example, the at least one posture sensor may also include at least one laser radar. For example, the at least one laser radar may be configured on the top of the cleaning apparatus 100 or 900 or any other one or more suitable locations on or in the cleaning apparatus 100 or 900, and may be configured to emit laser beams in all directions or in one or more predetermined directions or ranges, and to obtain laser point cloud data about surrounding environment or obstacles.

Then, for example, the processor or controller in the cleaning apparatus 100 or 900 may be configured to determine whether the orientation or moving direction of the cleaning apparatus 100 or 900 becomes parallel to the edge of the wall of the pool, for example based on the laser point cloud data from the at least one laser radar.

Then, for example, the processor or controller in the cleaning apparatus 100 or 900 may terminate the rotation of the cleaning apparatus 100 or 900 by the second angle in advance in a case of (for example, in response to) a determination during the rotation of the cleaning apparatus 100 or 900 by the second angle that the orientation or moving direction of the cleaning apparatus 100 or 900 becomes parallel to the edge of the wall of the pool close to and facing the side of the cleaning apparatus 100 or 900.

It is appreciated that although the steps or operations in the flowcharts are shown in sequence as indicated by the arrows, these steps or operations are not necessarily executed in sequence as indicated by the arrows. Unless explicitly stated herein, the execution of these steps or operations is not strictly limited in order, and they may be executed in other orders. Moreover, at least a part of the steps or operations in the flowcharts may include a plurality of sub-steps or stages, which may not necessarily be completed at the same time, but may be executed at different times, and the execution order may not necessarily be sequential, but may be executed alternately or alternatively with other steps or at least a part of sub-steps or stages of other steps or operations.

A part of possible embodiments of this disclosure are illustrated above. For those ordinary skilled in the art, improvements and modifications may be made without departing from this disclosure, which are also within the protection scope of this disclosure.

What is claimed is:

1. A method for controlling an apparatus for cleaning a pool comprising:
    controlling the apparatus to move along a first edge of walls of the pool;
    detecting a distance to a second edge of the walls in front of the apparatus while the apparatus moves along the first edge;
    determining an arrival of the apparatus at a corner formed by the first edge and the second edge in a case of a detection that the distance to the second edge is less than a predetermined threshold for distance;
    rotating the apparatus by a first angle in response to the arrival of the apparatus at the corner;
    detecting a plurality of first distances between the apparatus and the second edge at a plurality of respective locations along the second edge during the rotation of the apparatus by the first angle to obtain a plurality of respective first data points;
    determining an extension direction of the second edge based on the plurality of first data points;
    detecting an orientation of the apparatus using at least one posture sensor;
    determining a second angle between the extension direction of the second edge and the orientation of the apparatus; and
    rotating the apparatus by the second angle to allow the apparatus to move along the second edge.

2. The method of claim 1 wherein the determining the extension direction of the second edge based on the plurality of first data points comprises calculating the extension direction of the second edge by performing a data fitting of the plurality of respective first data points.

3. The method of claim 1 further comprising:
    data point determining a reference direction vector based on the distances detected for a first data point and a second data point of the plurality of the first data points;
    determining an angle between the reference direction vector and vector extending in the extension direction of the second edge;
    modifying the vector extending in the determined extensions direction of the second edge into an opposite direction in a case where the angle between the reference direction vector and the vector extending in the extension direction of the second edge exceeds a predetermined range.

4. The method of claim 1 further comprising:
determining the orientation of the apparatus based on data measured by an inertial measurement unit in the apparatus.

5. The method of claim 1 further comprising:
controlling the apparatus to clean a water surface of the pool along the walls with the apparatus being at least a predetermined distance away from the walls.

6. The method of claim 5 wherein the predetermined distance is larger than or equal to 25 cm and is less than or equal to 35 cm.

7. The method of claim 1 wherein the first angle is larger than or equal to 10 degrees and is less than or equal to 40 degrees.

8. The method of claim 1 wherein a number of the plurality of the first data points is larger than or equal to 20 and is less than or equal to 100.

9. The method of claim 1 further comprising:
during rotation of the apparatus by the second angle, terminating the rotation of the apparatus in a case where the orientation of the apparatus is parallel to the second edge before a completion of the rotation of the apparatus by the second angle.

* * * * *